Nov. 3, 1964   O. E. HERMANNS   3,154,985
AIRCRAFT TIRE VENTING APPARATUS
Filed April 20, 1962   3 Sheets-Sheet 3

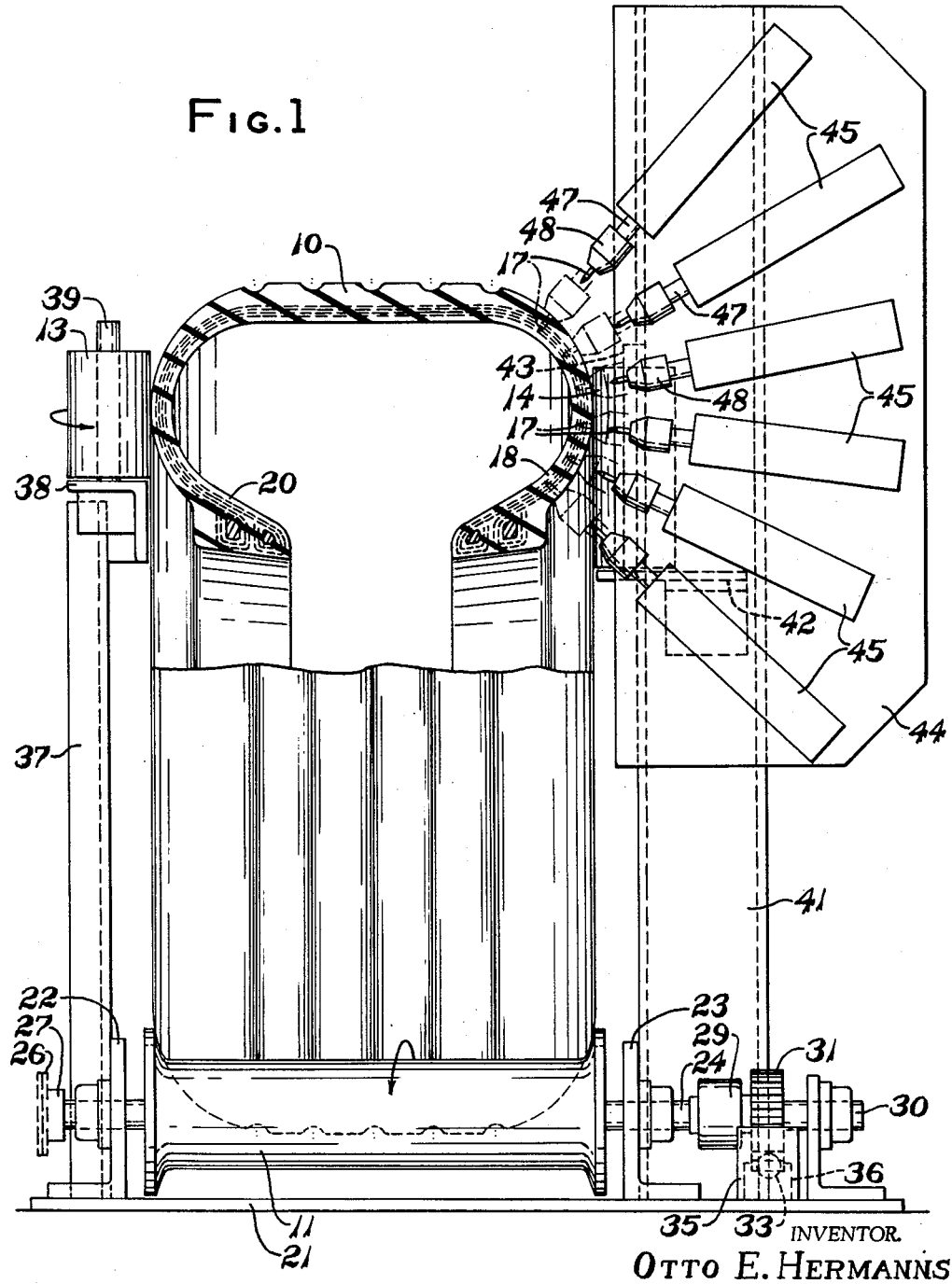

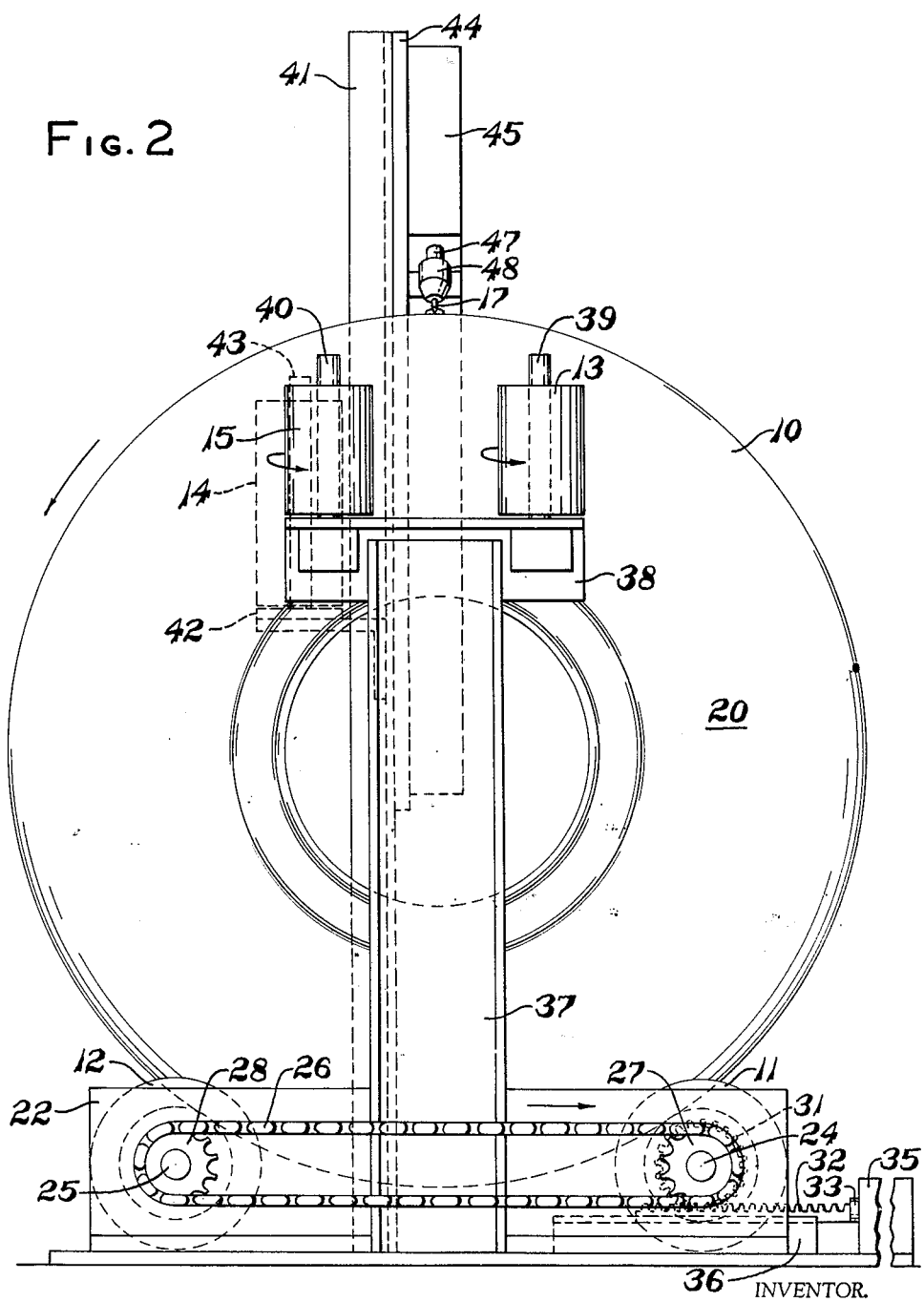

INVENTOR.
OTTO E. HERMANNS
BY
William L Reeve
ATTY.

United States Patent Office

3,154,985
Patented Nov. 3, 1964

3,154,985
AIRCRAFT TIRE VENTING APPARATUS
Otto E. Hermanns, Akron, Ohio, assignor to The B. F. Goodrich Company, New York, N.Y., a corporation of New York
Filed Apr. 20, 1962, Ser. No. 189,065
9 Claims. (Cl. 83—2)

This invention pertains to an apparatus for permitting the escape of gaseous material trapped within the carcass of multiple ply elastomeric articles during their manufacture, and, more particularly, to an apparatus for piercing the sidewalls of a vulcanized rubber aircraft tire to a predetermined depth less than complete piercing thereof to allow the escape of air or adhesive solvent vapors trapped between adjacent plies of rubber and rubberized cord fabric during tire manufacture.

In the manufacture of aircraft tires, particularly those intended for use on large commercial and military aircraft, the existence of an air or adhesive solvent vapor embolism poses a serious problem. Any such gaseous material although originally confined in a relatively small pocket, will tend to expand due to heat buildup in the tire during high speed aircraft takeoff and landing operations, with resultant destructive ply separation and possible total failure of the tire. At the increasingly high takeoff and landing speeds of today's military and commercial aircraft any such failure allows the aircraft's pilot little or no time for remedial action to prevent the possibility of heavy loss of life and property.

It became incumbent then upon those bearing the responsibility for the manufacture of heavy aircraft tires to devise a means for facilitating the escape of such gases from the carcass of the tires. Many expedients have been utilized in the past attempts to facilitate the escape of such gases, both during and following fabrication of the tires. For example, during fabrication, pricked elastomeric cord fabric has been used to provide passages for the gases, and gas removal was also attempted by progressively stitching the plies from the central region of the carcass toward the beads to squeeze or "milk" the gases to the edges of the plies. While the use of these media of gas removal are partially effective, sufficient gas frequently remains to cause an excessive number of tire defects and potential danger. This is due, in part, to the fact that the pricked holes in the unvulcanized rubberized cord fabric are easily smeared over and closed during handling of the fabric, while the stitching rolls are not always applied with sufficient pressure to effectively "milk out" the gases. It therefore became necessary, in addition to these expedients, to pierce the sidewalls of the tires following their vulcanization to provide bleed passages for any pockets of gas remaining in the tires or which were developed during their vulcanization or use.

Apparatus has been made which provides the necessary passageways by gripping and flattening a sidewall of the tire and forcing a plurality of piercing members into the sidewall at spaced locations about the circumference of the sidewall during but one piercing operation for each sidewall. This provides adequate bleed passages in tires of the automotive vehicular type, but for aircraft tires a great many more passageways must be provided due to the increased number of reinforcing plies incorporated in the tire's carcass and to more nearly insure complete venting of all gases trapped therein. For example, in a tire suitable for use in the larger commercial and military aircraft, in excess of 400 bleed passageways may need to be formed in each sidewall to provide a tire which is reasonably able to free itself from all gaseous materials trapped therein. Furthermore, it is impractical to attempt to flatten the sidewalls during the piercing operation due to the relative rigidity of the heavier aircraft carcass.

The principal object of this invention, therefore, is to provide an apparatus whereby a multiple ply annular elastomeric article, such as a pneumatic aircraft tire, may be rapidly and accurately pierced to a predetermined depth less than complete piercing of the tire body to permit the escape of gases trapped within the carcass of the article during its fabrication.

Another object of this invention is to provide an apparatus for simultaneously piercing a portion of at least one sidewall of a rubber tire to a predetermined depth, less than complete piercing of the sidewall, at a plurality of generally circumferentially and radially spaced locations.

It is a further object of this invention to provide an apparatus for simultaneously piercing a portion of at least one sidewall of a rubber tire to a predetermined depth, less than complete piercing of the sidewall, at a plurality of generally circumferentially and radially spaced locations, wherein means are provided to incrementally rotate said tire about its axis in response to completion of the piercing of said portion.

Further objects and advantages of the invention will be apparent to those skilled in the art to which it pertains from the following detailed description of a preferred embodiment of the invention and from the drawings forming a part of this application, in which:

FIG. 1 is a front elevational view of the tire piercing apparatus with an aircraft tire, partially in section, mounted thereon;

FIG. 2 is a side elevational view of the tire piercing apparatus;

*General Description*

Figure 4:
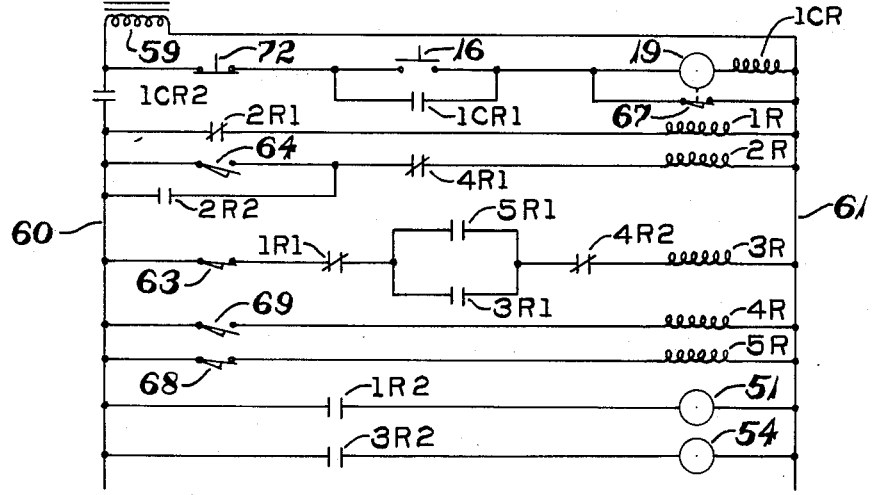
FIG. 4 is a schematic, across-the-lines diagram of the electrical circuit used to control the machine's operation.

The illustrated apparatus embodying the invention operates semi-automatically to vent a large aircraft tire sidewall by piercing it to a predetermined depth, less than complete piercing of the sidewall, simultaneously at a plurality of generally circumferentially and radially spaced locations. This is effected by placing a vulcanized tire 10 onto a pair of tire cradling rolls 11, 12, the tire being held upright thereon by means of side support rollers 13, 14, 15. The operator starts the operation by depressing a start button 16 which causes the sidewall piercing members 17 to be moved to and from penetrating contact with a sidewall 18 of the tire 10. After the piercing members 17 are removed from the sidewall 18, rolls 11 and 12 are rotated a predetermined amount and the piercing members 17 are again caused to be moved to and from contact with the sidewall 18. This cycle is continued for a predetermined number of times which will insure complete piercing of all circumferential and radical portions of the sidewall 18 at which time a presettable cycle counter 19 causes the piercing operations to cease. The tire 10 may then be reversed on rolls 11 and 12 to present its other sidewall 20 for piercing by members 17.

Although the apparatus has been described and illustrated as one for piercing but one tire sidewall at a time for simplicity of description, it will be apparent that without the exercise of additional inventive ingenuity a second bank of piercing members 17 may be mounted on the opposite side of the apparatus to enable simultaneous piercing of both tire sidewalls 18 and 20.

Structural Description

The apparatus as illustrated rests upon a base plate 21. Mounted on plate 21 are a pair of vertical parallel plates 22, 23, in and between which are journalled a pair of parallel horizontal shafts 24 and 25. Mounted on shafts 24 and 25 are cradling rolls 11 and 12, respectively. Rolls 11 and 12 are connected for joint rotation by means of a chain 26 passing about sprockets 27 and 28 mounted on one end of shafts 24 and 25, respectively. The other end of shaft 24 is connected to a one-way rotary clutch 29. A short shaft 30, journalled above plate 21 coaxially with shaft 24, is also connected to clutch 29 in such manner that rotation of shaft 30 in one direction, clockwise as viewed in FIG. 1, rotates shaft 24 in the same direction, while rotation of shaft 30 in the opposite direction imparts no movement to shaft 24. A pinion gear 31 is mounted on shaft 30 and is engaged with a rack 32 which is formed in the end of a movable piston rod 33 mounted on the piston 34 of a single-acting, spring return air cylinder 35. Piston rod 33 is guided in a slideway 36 mounted on base plate 21. Mounted on vertical plate 22 and base plate 21 is a vertical stanchion 37, having a cross support member 38 mounted on its upper end. Rotatably mounted on vertical shafts 39, 40 at opposite ends of cross member 38 are side support rollers 13 and 15, respectively. A vertical stanchion 41 is mounted on baseplate 21 and plate 23. A horizontal support member 42 projects from the rear of stanchion 41 and supports a shaft 43 on which side support roller 14 is rotatably mounted. Mounted on the front side of stanchion 41, and at the upper end thereof, is a vertical plate member 44. Mounted on plate 44 are a plurality of single-acting, spring return air cylinders 45, having pistons 46 and piston rods 47. Each piston rod 47 has mounted at its outer end a chuck 48 having a pointed piercing member 17, preferably of 1/16 inch diameter, removably mounted therein for movement toward and away from penetrating contact with the sidewall 18 of tire 10. The length of piercing members 17 is selected which will cause the tip of the member to penetrate the sidewall 18 to the depth of the innermost carcass ply when the chuck 48 contacts the sidewall.

Electrical-Pneumatic Controls

Figure 3:
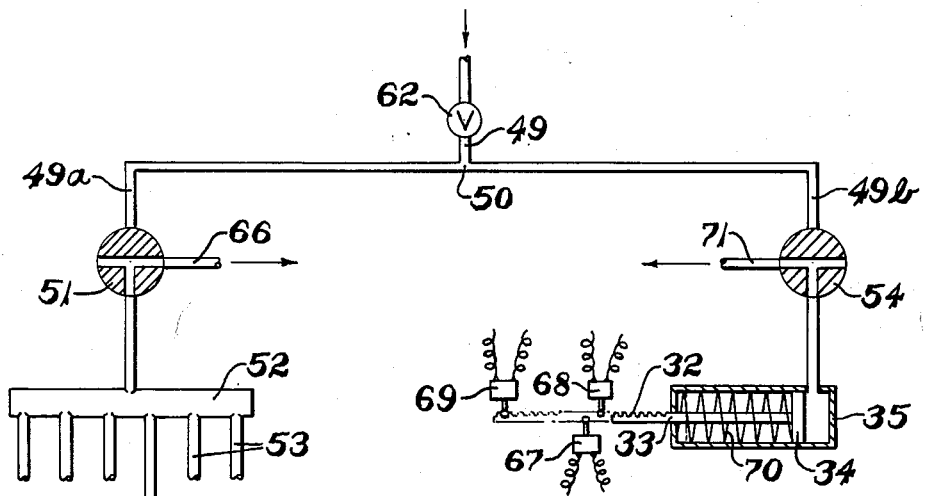
FIG. 3 is a schematic represention of the pneumatic circuit used in the operation of the tire piercing machine.

Air under elevated pressure is supplied to the apparatus by means of a feed line 49, as seen only in FIG. 3. The feed line is divided, as at 50, with a portion of the air being sent through line 49a to a normally closed, three-way, solenoid valve 51. Valve 51 is operable to permit air in line 49a to flow to an air distribution manifold 52 from which air is distributed through line 53 to cylinders 45. Another portion of the air feed is diverted through line 49b to a normally closed, three-way, solenoid valve 54. Valve 54 is operable to permit air in line 49b to flow to cylinder 35.

The control circuit for governing the operative mechanism of the apparatus, as seen in FIG. 4, is operated by alternating electrical current. It is to be understood that conventional devices, such as current limiting resistances, overload devices, fuses, grounds and the like have been omitted for clarity of description and illustration.

It will be seen that power is supplied to the electrical circuit through power supply lines L1 and L2, which are connected to a source of electrical energy of the 2-phase alternating current type, not shown. Power lines L1 and L2 are connectable to circuit lines 55 and 56 by means of a double pole, single throw disconnect switch 57. Lines 55 and 56 are connected to the primary coil 58 of a stepdown transformer. The secondary coil 59 of this transformer is connected to supply lines or bus bars 60 and 61.

The interaction of the pneumatic and electrical circuits will be more readily understood from the following detailed operating description of the apparatus.

Operating Description

In operating the apparatus the operator places a tire 10 on cradling rolls 11 and 12, the tire being supported in an upright position by the side support rollers 13, 14, 15. The operator then sets the desired number of piercing cycles on counter 19, opens a valve 62 in air line 49, closes electrical switch 57, and depresses start button switch 16. Closing switch 16 energizes control relay 1CR, causing it to close its contacts 1CR1 and 1CR2 to effect a holding circuit about button switch 16 and to energize all of bus bar 60. Closure of contacts 1CR2 energizes relay 1R causing its contacts 1R1 to open and contacts 1R2 to close. Closure of contacts 1R2 energizes solenoid valve 51 allowing air to flow from feed line 49 through manifold 52 to each of the air cylinders 45 and causing pistons 46 to move to their dotted line positions. As pistons 46 so move, piercing members 17 pierce the sidewall 18 of tire 10, and a normally closed limit switch 63 is opened to hold its circuit open as chucks 48 move to their position shown in dotted line in FIGS. 1 and 3. As pistons 46 reach the end of their strokes one of the chucks 48 contacts a limit switch 64 closing its contacts to energize relay 2R. Energization of relay 2R opens its contacts 2R1 and closes its contacts 2R2. Opening of contacts 2R1 deenergizes relay 1R allowing its contacts 1R1 to agains close and contacts 1R2 to open. Opening of contacts 1R2 deenergizes solenoid valve 51 allowing piston 46 and piercing members 17 to be returned to their full line position under the force of return spring 65, opening limit switch 64 and closing limit switch 63. Air is exhausted from cylinder 45 through line 53 to valve 51 and exhaust line 66. Closure of contacts 2R2 effects a holding circuit about limit switch 64 to maintain energization of relay 2R. It will be seen that relay 5R was energized upon closing of contacts 1CR2 to close its contacts 5R1. Thus, upon closing of switch 63 relay 3R is energized, closing its contacts 3R1 to effect a holding circuit about contacts 5R1 and closing its contacts 3R2 to energize solenoid valve 54. Valve 54 is thus opened to allow air from line 49b to flow to cylinder 35 forcing its piston 34 and rack 32 to their dotted line positions as seen in FIG. 3. As rack 32 moves, shaft 30 is rotated to cause shaft 24 and cradling rolls 11 and 12 to rotate, thereby rotating the tire 10 thereon an amount determined by the stroke of piston rod 33. Also as rack 32 moves outward from cylinder 35 it first opens a normally closed limit switch 68 to energize the counting circuit of counter 19, then opens limit switch 67 and closes limit switch 69. Opening of limit switch 68 deenergizes relay 5R to open contacts 5R1. Closing of limit switch 69 at the end of the stroke of piston rod 33 energizes relay 4R to open its contacts 4R1 and 4R2. Opening of contacts 4R2 deenergizes relay 3R to open its contacts 3R1 and 3R2. Opening of contacts 3R2 deenergizes solenoid valve 54 allowing piston 34 and rack 32 to return to their full line positions under the force of return spring 70, air from cylinder 35 being exhausted through valve 54 to exhaust line 71. Opening of contacts 4R1 deenergizes relay 2R opening contacts 2R2 and closing contacts 2R1. Closure of contacts 2R1 again energizes relay 1R to repeat the piercing and rotating cycles. It will be seen that switch 68 acts as a safety interlock to prevent rotation of the tire 10 until rack 32 is fully retracted in position to rotate the tire a full step. The piercing and rotation continues automatically until the counter 19 has been energized by switch 67 the number of times for which the counter was preset. At this time counter 19 automatically deenergizes and resets itself cutting off current in its line to deenergize relay 1CR, which opens contacts 1CR1 and 1CR2 to shut off the apparatus. The operator may then reverse the tire 10 to present sidewall 20 to the piercing members 17, pressing start button switch 16 to repeat the piercing and rotational cycles. Button switch 72, it will be seen, is a safety stop switch which can be used to deenergize the entire circuit and stop the apparatus in the event of an emergency.

Although the invention has been described with reference to a specific embodiment thereof, it will be apparent that further modifications, refinements and features of adjustability may be made in the apparatus by those skilled in the art to which it pertains within the scope of the appended claims.

I claim:

1. An apparatus to provide passageways for the escape of gaseous materials from within the carcass of a rubber vehicle tire comprising means to support a tire for rotation about its axis, tire piercing means supported for movement to and from pentrating contact with the sidewall of a supported tire, indexing means operable to rotate the supported tire a predetermined part of one revolution upon each actuation, means responsive to movement of said piercing means from penetrating contact with the supported tire to initiate operation of said indexing means, and means responsive to completion of operation of indexing movement of said indexing means to initiate operation of said piercing means.

2. An apparatus as defined in claim 1 wherein said indexing means includes a reciprocating member and means to convert reciprocations of said reciprocating member to unidirectional arcuate movement of said tire supporting means.

3. An apparatus to provide passageways for the escape of gaseous materials from within the carcass of a rubber vehicle tire comprising means to support a tire for rotation about its axis, tire piercing means supported for movement to and from penetrating contact with the sidewall of a supported tire, indexing means operable to rotate the supported tire a predetermined part of one revolution upon each actuation, means responsive to movement of said piercing means from penetrating contact with the supported tire to initiate operation of said indexing means, means responsive to completion of operation of indexing movement of said indexing means to initiate operation of said piercing means, and means to terminate operation of said piercing and indexing means after a preselected number of operations thereof.

4. An apparatus to provide passageways for the escape of gaseous materials from within the carcass of a rubber vehicle tire comprising a plurality of tire cradling rolls rotatably mounted on said apparatus for supporting and rotating a tire about a horizontal axis, at least one tire piercing member mounted on said apparatus for movement radially relative to a sidewall of the supported tire, means for moving said member to and from penetrating contact with the sidewall of a supported tire, driving means operable on each actuation of said member to rotate at least one of said tire cradling rolls sufficiently to produce rotation of the supported tire through a part only of a revolution, means responsive to completion of tire-rotating movement of said driving means to initiate operation of said piercing member, and means responsive to movement of said piercing member away from penetrating contact with the supported tire to initiate operation of said driving means.

5. An apparatus as defined in claim 4 wherein said driving means includes a pinion, a rectilinearly movable rack engaging said pinion, means to effect reciprocating movement of said rack, and a one-way clutch connecting said pinion to one of said tire cradling rolls.

6. An apparatus to provide passageways for the escape of gaseous materials from within the carcass of a rubber vehicle tire comprising a plurality of tire cradling rolls rotatably mounted on said apparatus for supporting and rotating a tire about a horizontal axis, at least one tire piercing member mounted on said apparatus for movement radially relative to a sidewall of the supported tire, means for moving said member to and from penetrating contact with the sidewall of a supported tire, driving means operable on each actuation of said member to rotate at least one of said tire cradling rolls sufficiently to produce rotation of the supported tire through a part only of a revolution, means responsive to completion of tire-rotating movement of said driving means to initiate operation of said piercing member, means responsive to movement of said piercing member away from penetrating contact with the supported tire to initiate operation of said driving means, and means to terminate operation of said piercing member and said driving means after a preselected number of actuations thereof.

7. An apparatus to provide passageways for the escape of gaseous materials from within the carcass of a rubber vehicle tire comprising a plurality of tire cradling rolls rotatably mounted on said apparatus for supporting and rotating a tire about a horizontal axis, a plurality of tire piercing members mounted on said apparatus for movement to and from penetrating contact with a sidewall of the supported tire, resilient means normally urging said piercing members away from the supported tire, means to move said piercing members against the action of said resilient means an amount to cause penetration a predetermined depth into the sidewall of a supported tire, driving means operable to rotate at least one of said tire cradling rolls sufficiently to produce rotation of a supported tire through a part only of a revolution, means responsive to movement of said piercing members away from said penetrating contact to initiate operation of said driving means, and means responsive to completion of tire-rotating movement of said driving means to initiate movement of said piercing members.

8. An apparatus to provide passageways for the escape of gaseous materials from within the carcass of a rubber vehicle tire comprising a plurality of tire cradling rolls rotatably mounted on said apparatus for supporting and rotating a tire about a horizontal axis, a plurality of tire piercing members mounted on said apparatus for movement to and from penetrating contact with a sidewall of the supported tire, resilient means normally urging said piercing members away from the supported tire, means to move said piercing members against the action of said resilient means an amount to cause penetration a predetermined depth into the sidewall of a supported tire, driving means operable to rotate at least one of said tire cradling rolls sufficiently to produce rotation of the supported tire through a part only of a revolution, means responsive to movement of said piercing members away from said penetrating contact to initiate operation of said driving means, means responsive to completion of tire-rotating movement of said driving means to initiate movement of said piercing members, and means to terminate operation of said piercing and driving means after a preselected number of operations thereof.

9. An apparatus as defined in claim 8 wherein the said driving means includes a pinion, a rectilinearly movable rack engaging said pinion, and a one-way clutch connecting said pinion to one of said tire cradling rolls.

References Cited by the Examiner

UNITED STATES PATENTS

| | | | |
|---|---|---|---|
| 1,433,971 | 10/22 | Roberts | 157—13 X |
| 2,105,316 | 1/38 | Fleming | 57—13 |
| 2,133,438 | 10/38 | Eger | 157—13 |
| 2,524,489 | 10/50 | Strong | 157—13 |
| 2,561,012 | 7/51 | Clark | 156—87 X |
| 2,641,265 | 6/53 | Grady | 83—2 |
| 2,770,282 | 11/56 | Herzegh | 156—87 X |
| 2,924,267 | 2/60 | Meserve et al. | 157—13 |
| 2,936,828 | 5/60 | Richner | 157—13 |
| 3,095,773 | 7/63 | Hurst | 83—2 |
| 3,107,565 | 10/63 | Hermanns | 83—2 |
| 3,109,337 | 11/63 | Wise | 83—2 |
| 3,124,978 | 3/64 | Barns et al. | |

J. SPENCER OVERHOLSER, *Primary Examiner.*

WALTER SCHEEL, *Examiner.*